United States Patent [19]
DeJager et al.

[11] Patent Number: 5,533,018
[45] Date of Patent: Jul. 2, 1996

[54] MULTI-PROTOCOL PACKET FRAMING OVER AN ISOCHRONOUS NETWORK

[75] Inventors: Gregory L. DeJager; Erik R. Swenson, both of San Jose, Calif.

[73] Assignee: National Semiconductor Corporation, Santa Clara, Calif.

[21] Appl. No.: 361,603

[22] Filed: Dec. 21, 1994

[51] Int. Cl.$^6$ ..................................................... H04L 12/52
[52] U.S. Cl. .......................... 370/60.1; 370/79; 370/85.3; 370/94.2
[58] Field of Search ................................ 370/60, 60.1, 79, 370/85.1, 85.2, 85.3, 94.1, 94.2

[56] References Cited

U.S. PATENT DOCUMENTS

| | | | |
|---|---|---|---|
| 5,208,807 | 5/1993 | Gass et al. | 370/60.1 |
| 5,251,207 | 10/1993 | Abensour et al. | 370/60.1 |
| 5,315,588 | 5/1994 | Kajiwara et al. | 370/60.1 |
| 5,361,261 | 11/1994 | Edem et al. | 370/85.3 |
| 5,375,121 | 12/1994 | Nishino et al. | 370/94.2 |

OTHER PUBLICATIONS

Ser. No. 07/969,916 filed Nov. 1992 to Edem et al.
"IsoEnet Transforms LANs and WANs Into Interactive Multimedia Tools", Brian Edem et al., Computer Technology Review, Winter 1992, 3 pgs.
"ISO/IEC 3309" International Standard, reference number ISO/IEC 3309:1991(E), 1991, 6 pgs.
"ATM OVERVIEW", National Semiconductor Corporation ATM Overview F–Fred Device, Aug. 1993, entire booklet.
"ATM User–Network Interface Specification: Version 3.0", Technical Committee of the ATM Forum, pp. iii–103.

"IEEE Standards For Local & Metropolitan Area Networks", Prepared by IEEE 802.9a Editor, unapproved IEEE Standards Draft, Jul. 25, 1994, pp. i–289.

*Primary Examiner*—Douglas W. Olms
*Assistant Examiner*—Russell W. Blum
*Attorney, Agent, or Firm*—Skjerven, Morrill, MacPherson, Franklin & Friel; T. Lester Wallace

[57] ABSTRACT

An integrated circuit has an isochronous network port for receiving isochronous information from an isochronous network. To allow the integrated circuit to receive information packaged in accordance with two different packaging protocols (for example, HDLC and ATM), the integrated circuit includes a first framer/deframer circuit for deframing information packaged in accordance with a first packaging protocol (for example, HDLC) and a second framer/deframer circuit for deframing information packaged in accordance with a second packaging protocol (for example, ATM). A circuit switch is provided to cause incoming data to be deframed by the appropriate framer/deframer circuit depending on which slot of the network frame contained the information. Once deframed, a buffer manager controls storing of the information in a circular ring buffer in an external memory. A device residing on a host bus coupled to the integrated circuit may then read the information from the circular ring buffer via a parallel bus port of the integrated circuit. Information may also pass in the opposite direction from the parallel bus port, through a buffer memory port to the buffer memory, and from the buffer memory through the buffer memory port, through an appropriate framer/deframer circuit, through the isochronous network port, and onto the network.

44 Claims, 4 Drawing Sheets

Microfiche Appendix Included
(92 Microfiche, 1 Pages)

MULTI-PROTOCOL PACKET FRAMING OVER AN ISOCHRONOUS NETWORK

CROSS REFERENCE TO MICROFICHE APPENDIX

The microfiche appendix, which is a part of the present disclosure, entails one sheet of microfiche having a total of ninety-two (92) frames. The microfiche appendix contains RTL code and schematics of a specific embodiment of an integrated circuit in accordance with the present invention. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to isochronous networks.

BACKGROUND INFORMATION

Ethernet is a well known network protocol. See the IEEE specification 802.3 (the subject matter of which is incorporated herein by reference) for further background information on Ethernet. Ethernet is well suited for transferring large packets of information at spaced intervals. Information may, for example, be accumulated into a large packet and then sent in a relatively large packet from one Ethernet node to another Ethernet node. Ethernet can therefore be said to be a "bursty" network protocol.

Some types of information, such as the information in a typical telephone conversation, do not lend themselves to being accumulated over time and then being transmitted as a single large packet. In a telephone conversation, speech information should be passed from speaker to listener without significant delay because the listener may use that speech information to formulate a response. Accordingly, there is not time for large packets of information to be accumulated. Frequent transmissions of small packets of information over the network is required. Ethernet is not well suited to this "nonbursty" type of information transfer.

There are, however, communication protocols (called isochronous protocols) which are suited for communication of such "nonbursty" information. Circuit switching and time division multiplexing (TDM) techniques are employed to divide a communication medium into a number of consecutive frames, each frame including a number of time slots. A first telephone conversation may, for example, be allocated a first slot of each frame whereas a second telephone conversation may be allocated a second slot of each frame. Because telephone information for each conversation is received each frame, the "nonbursty" information of the telephone conversations is communicated without significant delay.

Isochronous networks may also be made to carry "bursty" information. Telephone companies use an information framing protocol known as "HDLC" to frame information ("bursty" and/or "nonbursty") for isochronous communication over a standard digital telephone line (an example of which is Primary Rate ISDN or "PRI"). HDLC is part of a more encompassing protocol called "X.25" See the document ISO/IEC 3309, 1991 (the subject matter of which is incorporated herein by reference) for additional information on the HDLC protocol.

Figure 1:
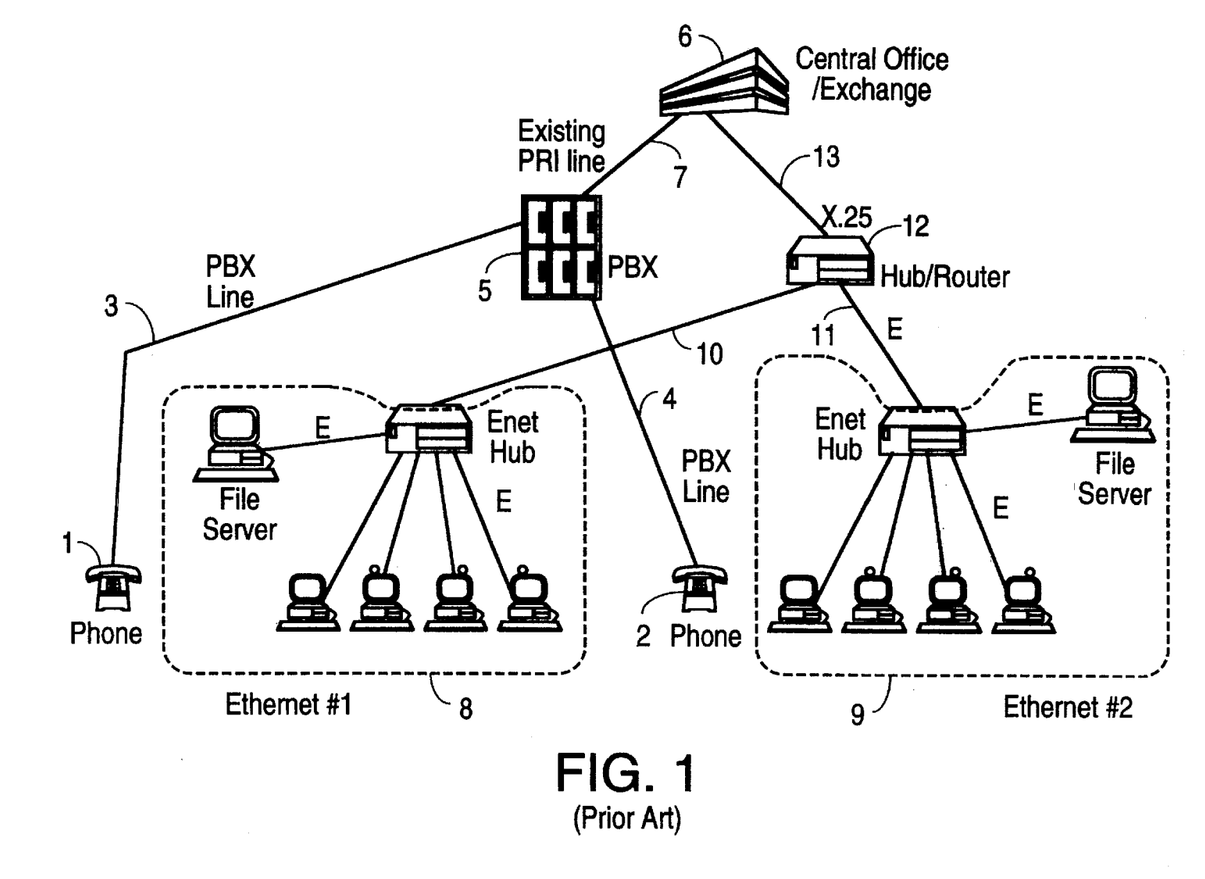
FIG. 1 (Prior Art) is a diagram showing an interconnection of Ethernet networks.

FIG. 1 (Prior Art) shows an interconnection of networks. Telephone information passes to and from telephones 1 and 2 over PBX (Private Branch Exchange) lines 3 and 4, respectively, to a local PBX 5. The local PBX 5 is coupled to a central office/exchange 6 (typically operated by a telephone company) via one or more PRI lines 7. "Nonbursty" telephone conversation information passes over this structure.

"Bursty" information such as video information and large computer files, on the other hand, passes over another structure. A first Ethernet network 8 having a plurality of workstations and a file server and an Ethernet hub is coupled to a second Ethernet network 9 via two Ethernet lines 10, 11 and an Ethernet hub/router 12. The file server of a network may, for example, store video data which can be accessed and displayed by the workstations of the network. Lines 10 and 11 are logically two different Ethernet lines. Hub/router 12 is coupled to the central office/exchange 6 via an isochronous link 13 such as a PRI line. Information is passed over link 13 using the HDLC protocol. The dots on selected workstations indicate video cameras.

A video camera of a workstation in the first Ethernet network can therefore capture video information and store that information in the file server of the first Ethernet network 8. A workstation in the second Ethernet network 9 can then access that information over Ethernet lines 10 and 11 via hub/router 12 and display that information. A workstation can also receive HDLC packaged "bursty" information (such as the yellow pages in graphic form) from the central office/exchange 6 via isochronous link 13.

There exists, however, another information packaging protocol known as asynchronous transfer mode (hereinafter "ATM"). See the document "ATM User-Network Interface Specification", Version 3.0 (the subject matter of which is incorporated herein by reference) for additional information on the ATM protocol. Although it is envisioned that ATM will eventually replace HDLC, it is likely that significant numbers of ATM and HDLC data communication services will coexist for a significant period of time. It would therefore be desirable to provide network node hardware capable of both ATM and HDLC communication. Furthermore, a user using the structure of FIG. 1 would likely have a telephone on his/her desk in addition to a workstation. Accordingly, a PBX line would extend onto the user's desk for coupling to the telephone and an Ethernet line would also extend onto the user's disk for coupling to the workstation. It would be desirable to eliminate one of these two lines so that the workstation could receive both "bursty" Ethernet information and "nonbursty" telephone information over a single line.

SUMMARY

An integrated circuit has an isochronous network port for receiving isochronous information from an isochronous network. To allow the integrated circuit to receive information packaged in accordance with two different packaging protocols (for example, HDLC and ATM), the integrated circuit includes a first protocol packet framer/deframer circuit for deframing information packaged in accordance with a first packaging protocol (for example, HDLC) and a second protocol packet framer/deframer circuit for deframing information packaged in accordance with a second packaging protocol (for example, ATM). A circuit switch is provided to steer incoming information to the appropriate packet framer/deframer circuit depending on which slot of the network frame carried the information.

In some embodiments, the information received from the network is stored in an external memory after being deframed. A buffer manager circuit may be provided on the integrated circuit to manage a circular inbound ring buffer of information in the external memory. A device, such as a CPU, residing on a host bus coupled to the integrated circuit may then read the information stored in the circular ring buffer via a parallel bus port of the integrated circuit. An arbiter circuit on the integrated circuit determines whether information from the framer/deframer circuit will be written to the external memory or whether the device on the host bus will read information from the external memory. In some embodiments, the integrated circuit includes a slot mapping memory which contains a map of which packet framer/deframer should be used for which slot. The slot mapping memory can be programmed from the host bus of the integrated circuit via the parallel bus port.

If information from the host bus is to be transmitted over the network, the information is written into the external buffer memory via the parallel bus port and the buffer memory port. The information is then framed by the appropriate packet framer/deframer circuit and is supplied to the isochronous network port of the integrated circuit via the circuit switch. The buffer manager circuit of the integrated circuit determines how the information is written into an outbound buffer of the external memory from the host parallel bus port and how that information is later read out of the outbound buffer and supplied to the packet framer/deframer circuit. The arbiter determines whether information received from the parallel bus port will be written into the external memory or whether information from the external memory will be supplied to the packet framer/deframer circuit for framing and transmission on the isochronous bus.

Other associated structures and methods are also disclosed.

DETAILED DESCRIPTION OF THE PREFERRED EMBODIMENTS

An isochronous network specified by IEEE 802.9a (herein after referred to as "isoENET") provides for transmission of both "nonbursty" and "bursty" information over a single Ethernet-compatible network. See the documents U.S. patent application Ser. No. 07/970,329 entitled "Frame-Based Transmission of Data"; IEEE specification 802.9a; and "IsoEnet Transforms LANs And WANs Into Interactive Multimedia Tools", National Semiconductor Corporation, by Brian Edem et al., 1992 (the subject matter of all three documents is incorporated herein by reference) for further information on the IsoENET isochronous network.

In an isoENET network, the information being transmitted is broken up into a plurality of frames of information by a plurality of synchronization pulses. In addition to dedicated Ethernet bandwidth, each frame contains 96 slots (also called "B-channels"). To transfer "bursty" information, multiple of these slots are filled with the bursty information. Several consecutive frames may be largely dedicated to the transfer of a burst of information whereas subsequent frames (after the burst) may carry no "bursty" information. To transfer "nonbursty" information, on the other hand, one slot of each successive frame may carry a small amount of "nonbursty" information. Accordingly, information from both a telephone and a workstation can be transferred over an isochronous network which is compatible with Ethernet.

Figure 2:
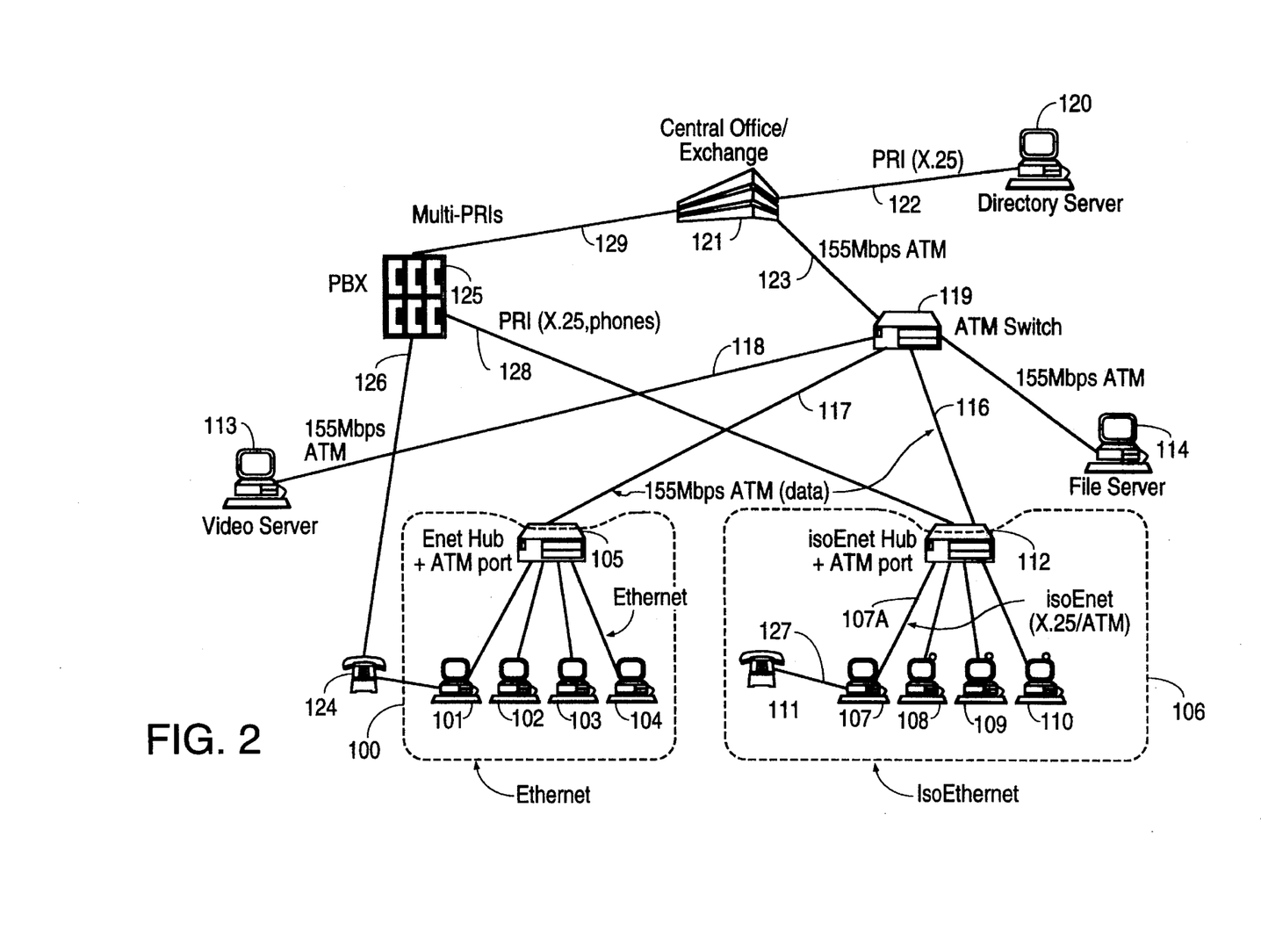
FIG. 2 is a diagram showing an isoENET network coupled to an Ethernet network in accordance with an embodiment of the present invention.

FIG. 2 shows an example of an interconnection of networks and services which may be typical in the future. Network 100 is one Ethernet network of the large installed base of Ethernet networks in use today. At least some of these installed Ethernet networks are likely to still be operating in the future. Ethernet network 100 involves four workstations 101–104 and an Ethernet hub 105. The workstations are coupled to the hub via corresponding Ethernet lines which function as one logical wire.

Network 106 is an isoENET network which is capable of isochronous information transfer and is also compatible with the installed base of Ethernet networks. IsoENET network 106 includes four workstations 107–110, a telephone 111, and an isoENET hub 112. Because isoENET is capable of transmitting "nonbursty" telephone conversation information, telephone 111 is coupled to the isoENET network via workstation 107.

Video information (for example, MPEG encoded video) for display by the workstations of the two networks is stored in this example in a video server 113. Programs for use by the workstations of the two networks are stored in this example in a file server 114. The servers 113 and 114 are coupled to the two networks 100 and 106 via high speed 155 Mbps (megabits per second) fiber optic links 115–118 and an ATM switch 119. Accordingly, video information may be packaged in ATM format and transmitted from the video server 113 in "bursty" fashion over 155 Mbps link 118, 155 Mbps link 116, and isoENET line 107A to workstation 107.

A directory server 120 which supplies information in HDLC format may be provided by a telephone company. Directory server 120 is coupled to a central office/exchange 121 via a PRI line 122. The central office/exchange 121 is coupled to the ATM switch via a 155 Mbps link 123. Accordingly, information (such as yellow page graphic information) may be packaged in HDLC format and transmitted from the directory server 120 in "bursty" fashion over PRI line 122, 155 Mbps link 123, 155 Mbps link 116, and isoENET line 107A to workstation 107. Workstation 107 therefore is an isoENET node capable of communicating using both ATM and HDLC protocols. The structure of workstation 107 is described in further detail later.

Because network 100 is a standard Ethernet network which does not support "nonbursty" telephone conversation information, a telephone 124 associated with workstation 101 is not coupled to a workstation of network 100 but rather is coupled to a PBX 125 via a PBX line 126. Because network 106 is an isoENET network, telephone 111 transmits and receives "nonbursty" telephone conversation information via PBX-like line 127, isoENET line 107A, and PRI line 128. PBX 125 is coupled to the central office/exchange 121 via multiple PRI lines 129.

Figure 3:
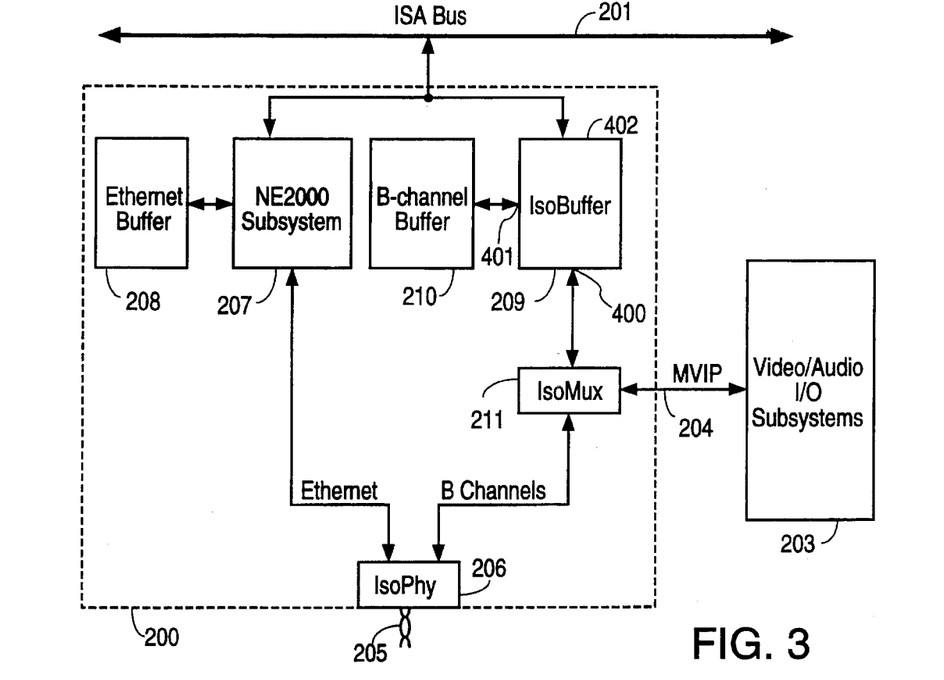
FIG. 3 is a simplified block diagram of an expansion card for coupling an ISA parallel bus to an isochronous network in accordance with an embodiment of the present invention.

FIG. 3 is a block diagram illustrating an expansion card 200 disposed inside workstation 107. See the document "HydraPro isoENET ISA Card Project Requirement Specification", National Semiconductor Corporation, 1994, (the subject matter of which is incorporated herein by reference) for additional information regarding a specific embodiment of expansion card 200. Although FIG. 2 shows workstations as being the isoENET and Ethernet nodes, it is to be understood that any suitable equipment may serve as isoENET and Ethernet nodes. Personal computers, printers, and other peripherals may serve as nodes. The term "workstation" is used in a nonlimiting sense only as an illustrative example.

In FIG. 3, the expansion card 200 is coupled via a card edge connector (not shown) to the ISA parallel bus 201 on the motherboard of the workstation 107. Video/audio I/O subsystems 203 are coupled to card 200 via a MVIP (Multi-Vendor Integration Protocol) bus 204. Video/audio I/O subsystems 203 may, for example, include a video camera, speakers, a microphone, and a video compressor/decompressor for compressing data output from the video camera for transmission on the MVIP bus 204 and for decompressing compressed video data received from the MVIP bus 204. The MVIP bus is a known parallel isochronous bus used for moving isochronous data from one card to another card.

IsoENET line 107A of FIG. 2 actually is in this embodiment a twisted pair of physical wires 205. The block 206 of FIG. 3 labeled isoPhy is an integrated circuit which performs the functions of level shifting and buffering the isoENET network signals on physical wires 205 as well as separating or combining Ethernet and B-channel data. See U.S. patent application Ser. No. 07/969,916 entitled "Network For Data Communication With Isochronous Capability" (the subject matter of which is incorporated herein by reference) for additional information on isoPhy block 206. An Ethernet subsystem integrated circuit 207 as well as an Ethernet buffer 208 are disposed in the Ethernet data path between isoPhy block 206 and ISA bus 201. These parts perform the standard Ethernet MAC (Media Access Control) function and manage transmit and receive packet buffers. An integrated circuit 209 labeled isoBuffer, a B-channel buffer 210, and a multiplexer/demultiplexer 211 labeled isoMux is disposed in the B-channel data path between isoPhy block 206 and ISA bus 201.

Figure 4:
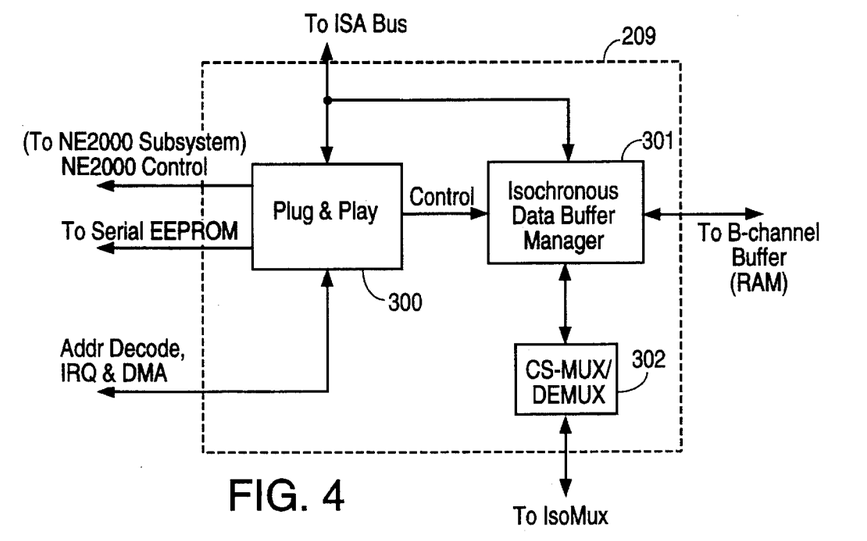
FIG. 4 is a simplified block diagram of an integrated circuit disposed on the expansion card of FIG. 3 in accordance with an embodiment of the present invention.

FIG. 4 is a logical block diagram illustrating the contents of the isoBuffer integrated circuit 209 of FIG. 3. See the document "isoBuffer Specification", National Semiconductor Corporation, 1994 (the subject matter of which is incorporated herein by reference) for additional details on a specific embodiment of integrated circuit 209. Integrated circuit 209 includes a plug and play block 300, an isochronous data buffer manager block 301, and a circuit switch multiplexer/demultiplexer block 302. At system boot, the central processing unit (not shown) of the workstation which is coupled to ISA bus 201 determines the needs and functions of card 200 via resource data stored in an EEPROM (not shown) on the card in accordance with the Microsoft Plug and Play Specification. Plug and play block 300 controls the EEPROM, decodes I/O addresses on the ISA bus, provides hardware chip selects for other chips on card 200, and routes interrupt requests to the appropriate IRQ lines of the ISA bus.

Figure 5:
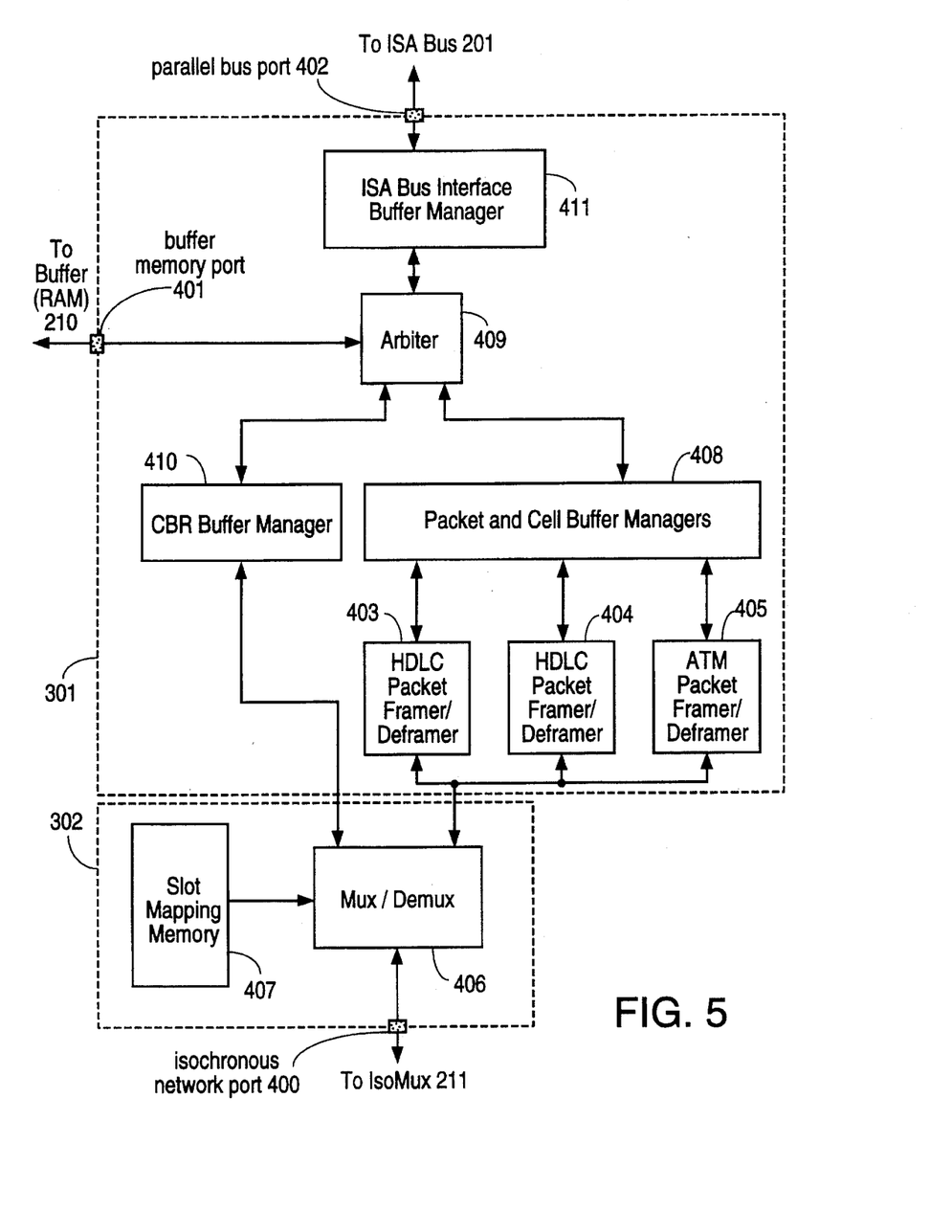
FIG. 5 is a more detailed block diagram illustrating a part of the integrated circuit of FIG. 4 in accordance with an embodiment of the present invention.

FIG. 5 is a block diagram illustrating blocks 301 and 302 of FIG. 4 in greater detail. Information received from network wires 205 of FIG. 3 is received into the isoBuffer integrated circuit 209 on an isochronous network port 400, proceeds through the isoBuffer as explained in further detail below, and is written to external buffer memory 210 via a buffer memory port 401. The CPU of the workstation can later access that information in external buffer memory 210 so that the information is read from buffer 210, passes through buffer memory port 401, and passes onto the ISA bus 201 via a parallel bus port 402. Information can also flow in the opposite direction such that information to be transmitted on network wires 205 is written by the CPU into the external buffer memory 210 via parallel bus port 402 and buffer memory port 401. This information is later read from the external buffer memory 210 and output onto network wires 205 via buffer memory port 401 and isochronous network port 400.

To allow workstation 107 (see FIG. 2) to receive and transmit information packaged in both HDLC and ATM protocols, isoBuffer integrated circuit 209 includes two HDLC packet framer/deframer circuits 403 and 404, an ATM packet framer/deframer circuit 405, a multiplexer/demultiplexer 406, and a slot mapping memory 407. Packet framer/deframer circuits are known in the art. See the document "ATM OVERVIEW F-Fred Device-DP83372/R-Fred Device DP83382", National Semiconductor Corporation, 1993 (the subject matter of which is incorporated herein by reference) for additional information pertaining to a packet framer/deframer circuit. A packet may, for example, consist of a handful to several thousand bytes of information. (Although a "framer/deframer" circuit does not really "frame" or "deframe" information but rather "packetizes" or "depacketizes" information, the term "packetizer/depacketizer" is not is used herein because the term "packetizer" is not commonly used in the industry.)

Assume for illustrative purposes that isoENET frames are to be received from wires 205 of FIG. 3, that the first slot of each frame contains a byte of a packet framed in accordance with the HDLC protocol, and that the second slot in each frame contains a byte of a packet framed in accordance with the ATM protocol. First, a 256 by 4-bit receive portion of the slot mapping memory 407 is initialized by the workstation CPU from the ISA bus 201 so that the contents of each of the 256 memory locations of memory 407 indicates which of the packet framer/deframer circuits is to be used to deframe a corresponding one of the 256 slots of a frame. The first memory location of memory 407 is programmed to contain a value indicating that a HDLC packet framer/deframer circuit is to be used to frame or deframe information for the first slot whereas the second memory location is programmed to contain a value indicating that the ATM packet framer/deframer circuit is to be used to frame or deframe information for the second slot.

After this initialization of the slot mapping memory 407, a channel counter (not shown) of circuit switch multiplexer/demultiplexer block 302 provides addresses to the receive portion of the slot mapping memory 407. Initially, the channel counter outputs a value which addresses the first memory location of the receive portion of memory 407. Because the first memory location of memory 407 was initialized to contain data which causes multiplexer/demultiplexer circuit 406 and HDLC packet framer/deframer circuit 404 to perform packet deframing, the first slot of the isoENET frame is deframed by HDLC packet framer/deframer circuit 404. After the information from the first slot is received, the channel counter is incremented. At the start of the second slot, the receive portion of memory 407 is read using the incremented count value output from the channel counter for the memory address. Because the second memory location of memory 407 was initialized to contain data which causes multiplexer/demultiplexer circuit 406 and ATM packet framer/deframer circuit 405 to perform packet deframing, the second slot of the isoENET frame is deframed by ATM packet framer/deframer circuit 405. After the information from the second slot is received, the channel counter is again incremented. Deframing of each successive slot of the isoENET frame proceeds in like fashion. The channel counter is reset by the rising edge of the frame synchronization signal received on wires 205 at the end of the frame. As an incoming packet is deframed, it is stored in a dedicated location in buffer 210.

When information is being written into buffer RAM 210 from one of the packet framer/deframer circuits, a buffer manager in block 408 of the integrated circuit determines where in memory 210 that information is written so that a separate receive ring buffer is maintained in memory 210 for each packet framer/deframer. The location and size of each ring buffer is set from the ISA bus by writing control registers in block 408. Four control registers are associated with each packet framer/deframer circuit: a control register defining the beginning location of the ring buffer in physical memory 210, a control register defining the ending location of the ring buffer in physical memory 210, a control register defining where in memory 210 the next incoming packet is to be written, and a control register defining where in memory 210 the oldest packet unread by the CPU is located. After an entire packet has been received and deframed by the appropriate packet framer/deframer circuit, the CPU is signalled via the ISA bus 201 that packet reception is complete. The CPU can then commence in the transfer of the packet data stored in buffer 210 to system memory via the ISA bus 201.

The block 408 actually includes two independent buffer managers. Each buffer manager is coupled to an associated packet framer/deframer circuit. Two HDLC packet framer/deframer circuits 403 and 404 are provided in the specific embodiment in order to support a specific video conferencing method. The present invention is not, however, limited to require two packet framer/deframers for the same protocol.

In some embodiments, block 408 also includes circuitry for managing a "receive cell buffer" in memory 210. The receive cell buffer can be used as a receptacle for ATM cells (a "cell" is an ATM construct and is 53 bytes of ATM information). When an ATM cell is received that is not part of a packet of information being written into a receive ring buffer, the ATM cell may be stored in the receive cell buffer. These stored ATM cells can then be accessed later via the ISA bus 201. Such ATM cells may, for example, be intermittently transmitted ATM cells which indicate the status of a conference call when the conversation of the conference call itself is being written into a receive ring buffer in memory 210. The receive cell buffer makes use of hardware in an ATM packet framer/deframer circuit which identifies cells from raw incoming data but does not utilize the higher level deframing hardware which identifies, packets of cells.

IsoBuffer integrated circuit 209 also includes a constant bit rate (CBR) buffer manager block 410 which manages raw unframed or nondeframed streams of data. The CBR buffer manager 410 keeps track of where a stream of raw data is being written into memory 210 by tracking frames (frames usually are transmitted at a 8 kHz rate) rather than by tracking the beginning and ending of packets. Given the number of bytes in a frame, and the starting location in memory 210, CBR buffer manager 410 can determine from the number of frames received the location at which raw nondeframed information is being written into memory 210. Nondeframed data in memory 210 may be deframed later in software by a CPU coupled to ISA bus 201. This constant bit rate buffer feature may be used to support a high level protocol which is not supported in hardware on integrated circuit 209 by a dedicated packet framer/deframer circuit.

Arbiter 409 determines which of the ISA bus 201, the buffer managers in block 408, or the CBR buffer manager 410 will have access to the buffer RAM 210. Any number of arbiter circuits can be used for this purpose. In one embodiment, each of the blocks 408, 410 and an ISA bus interface 411 provides a request signal on its own dedicated request line to the arbiter 409.

The microfiche appendix contains RTL code and schematics describing a specific embodiment of an integrated circuit which is described in block diagram form by FIGS. 3–5. The RTL code specifies blocks 403–408 of FIG. 5 whereas the schematics specify blocks 409–411. It is to be understood that the block diagram of FIG. 5 is illustrative of the functions of the various blocks and does not necessary indicate physical connections between the hardware circuits. In some embodiments, multiplexer/demultiplexer 406 is not disposed in the data path between the isochronous network port of the integrated circuit and the packet framer/deframer circuits of the integrated circuit but rather the packet framer/deframer circuits are all coupled substantially directly to the isochronous network port and appropriate ones of the packet framer/deframer circuits are enabled one at a time by multiplexer/demultiplexer 406. Similarly, the buffer managers in block 408 and the CBR buffer manager in block 410 are not actually physically disposed in the illustrated data paths to buffer memory port 401 but rather are associated with information transfers through these paths. In some embodiments, arbiter 409 includes a bidirectional multiplexer/demultiplexer for coupling a selected data path to buffer memory port 401. The selected data path may extend from ISA bus 201, from isochronous network port 400, or from one of the packet framer/deframer circuits 403–405. In some embodiments a multiplexer in block 406 selectively couples the respective outputs of the framers in blocks 403–405 to an output part of port 400 whereas a demultiplexer in block 406 simultaneously selectively couples an input part of port 400 to the deframers in blocks 403–405.

Although the invention is described in connection with certain illustrative embodiments for instructional purposes, the invention is not limited thereto. In some embodiments, the buffer memory is disposed on the same integrated circuit as the packet framer/deframer circuits and the circuit switch multiplexer/demultiplexer. Buses other than the ISA bus can be supported including the PCI bus and the Apple NuBUS. Accordingly, modifications, adaptations, and combinations of various aspects of the specific embodiments can be practiced without departing from the scope of the invention as set forth in the following claims.

What is claimed is:

1. An integrated circuit, comprising:

an isochronous network port;

a first protocol packet framer/deframer circuit;

a second protocol packet framer/deframer circuit; and a circuit switch multiplexer/demultiplexer coupled to said isochronous network port, said first protocol packet framer/deframer circuit, and said second protocol packet framer/deframer circuit, wherein said circuit switch multiplexer/demultiplexer comprises a multiplexer/demultiplexer, and a storage device, said multiplexer/demultiplexer being at least in part controlled based on a value output from said storage device.

2. The integrated circuit of claim 1, wherein a plurality of isochronous frames are received on said isochronous network port, each of said isochronous frames comprising a plurality of slots, a first of said slots of a frame being supplied to and deframed by said first protocol packet framer/deframer circuit, a second of said slots of said frame being supplied to and deframed by said second protocol packet framer/deframer circuit.

3. The integrated circuit of claim 1, wherein said first protocol packet framer/deframer circuit deframes ATM formatted slots, and wherein said second protocol packet framer/deframer circuit deframes HDLC formatted slots.

4. The integrated circuit of claim 3, wherein said first protocol packet framer/deframer circuit deframes ATM cells.

5. The integrated circuit of claim 3, wherein said first protocol packet framer/deframer circuit deframes both ATM cells and ATM packets.

6. The integrated circuit of claim 1, wherein said storage device comprises a plurality of memory locations, and wherein said circuit switch multiplexer/demultiplexer further comprises:
a receive counter, said receive counter being incremented after a receipt of a slot of information received on said isochronous network port, a count value output from said receive counter pointing to a corresponding memory location of said plurality of memory locations of said storage device.

7. The integrated circuit of claim 1, further comprising:
a parallel bus port, said storage device being accessible from said parallel bus port.

8. The integrated circuit of claim 1, further comprising:
a parallel bus port;
parallel bus interface circuitry coupled to said parallel bus port;
a memory; and
an arbiter circuit coupled to said parallel bus interface circuitry and to said memory, said arbiter arbitrating access to said memory.

9. The integrated circuit of claim 8, further comprising:
a buffer manager circuit coupled to said first protocol packet framer/deframer circuit, said second protocol packet framer/deframer circuit and to said arbiter circuit, said buffer manager circuit comprising:
first and second receive pointer registers for pointing to a receive buffer in said memory; and
first and second transmit pointer registers for pointing to a transmit buffer in said memory.

10. The integrated circuit of claim 8, further comprising:
means, coupled to said circuit switch multiplexer/demultiplexer, for managing buffering of substantially non-deframed isochronous network data in said memory.

11. A method, comprising:
deframing information of a slot of a frame of network information using a first protocol packet deframer circuit;
deframing information of another slot of said frame of network information using a second protocol packet deframer circuit, said first and second protocol packet deframer circuits both being disposed on the same integrated circuit;
incrementing a counter of said integrated circuit so that a count value output from said counter corresponds with a slot number of the slot being received into said integrated circuit; and
using said count value to address a slot mapping memory of said integrated circuit.

12. The method of claim 11, wherein said integrated circuit has a parallel bus port, said method further comprising:
programming said slot mapping memory of said integrated circuit via said parallel bus port.

13. The method of claim 11, further comprising:
storing information deframed by said first protocol packet deframer circuit in a first ring buffer; and
storing information deframed by said second protocol packet deframer circuit in a second ring buffer.

14. An integrated circuit, comprising:
a first packet deframer circuit which deframes information in accordance with a first network protocol;
a second packet deframer circuit which deframes information in accordance with a second network protocol; and
means for causing said first packet deframer circuit to deframe information in a first isochronous network slot of a frame in accordance with said first network protocol and for causing said second packet deframer circuit to deframe information in a second isochronous network slot of said frame in accordance with said second network protocol, wherein said means comprises means for storing slot mapping information.

15. The integrated circuit of claim 14, wherein said first network protocol is an ATM protocol and wherein said second network protocol is an HDLC protocol.

16. An integrated circuit comprising:
a first packet deframer circuit which deframes information in accordance with a first network protocol;
a second packet deframer circuit which deframes information in accordance with a second network protocol;
means for causing said first packet deframer circuit to deframe information in a first isochronous network slot of a frame in accordance with said first network protocol and for causing said second packet deframer circuit to deframe information in a second isochronous network slot of said frame in accordance with said second network protocol;
means for managing a receive ring buffer;
a parallel bus port; and
parallel bus interface circuitry coupled to said parallel bus port.

17. The integrated circuit of claim 14, further comprising:
a first packet framer circuit which frames information in accordance with a network protocol; and
a second packet framer circuit which frames information in accordance with a network protocol,
wherein said means for causing comprises:
a multiplexer having a first input lead, a second input lead, and an output lead, said first input lead being coupled to an output lead of said first packet framer circuit, said second input lead being coupled to an output lead of said second packet framer circuit, and an output lead being coupled to an output part of an isochronous network port of said integrated circuit; and
a demultiplexer having an input lead, a first output lead, and a second output lead, said input lead being coupled to an input part of said isochronous network port, said first output lead being coupled to an input lead of said first packet deframer circuit, and said second output lead being coupled to an input lead of said second packet deframer circuit.

18. An integrated circuit, comprising:

an isochronous network port, wherein the isochronous network port receives frame of information, said frame having a plurality of non-isochronous and isochronous slots, and each of said isochronous slots having information of one of at least a first protocol or a second protocol;

a first protocol packet framer/deframer circuit;

a second protocol packet framer/deframer circuit; and a circuit switch multiplexer/demultiplexer coupled to said isochronous network port, said first protocol packet framer/deframer circuit, and said second protocol packet framer/deframer circuit, wherein the circuit switch multiplexer/demultiplexer couples said isochronous first protocol slots to the first protocol packet framer/deframer circuit and couples said isochronous second protocol slots to the second protocol packet framer/deframer circuit.

19. The integrated circuit of claim 18 further comprising:

a first demultiplexer coupled to said isochronous network port, wherein the first demultiplexer separates the non-isochronous slots from the isochronous slots, and the circuit switch multiplexer/demultiplexer is coupled to the first demultiplexer.

20. The integrated circuit of claim 18, wherein said circuit switch multiplexer/demultiplexer comprises:

a multiplexer/demultiplexer; and a storage device, said multiplexer/demultiplexer being at least in part controlled based on a value output from said storage device.

21. The integrated circuit of claim 18, wherein a plurality of isochronous slots are received on said isochronous network port, a first of said isochronous slots of a frame being provided to and deframed by said first protocol packet framer/deframer circuit, and a second of said isochronous slots of said frame being provided to and deframed by said second protocol packet framer/deframer circuit.

22. The integrated circuit of claim 18, wherein said first protocol packet framer/deframer circuit deframes ATM formatted slots, and wherein said second protocol packet framer/deframer circuit deframes HDLC formatted slots.

23. The integrated circuit of claim 22, wherein said first protocol packet framer/deframer circuit deframes ATM cells.

24. The integrated circuit of claim 22, wherein said first protocol packet framer/deframer circuit deframes both ATM cells and ATM packets.

25. The integrated circuit of claim 20, wherein said storage device comprises a plurality of memory locations, and wherein said circuit switch multiplexer/demultiplexer further comprises:

a receive counter, said receive counter being incremented after a receipt of a slot of information received on said isochronous network port, a count value output from said receive counter pointing to a corresponding memory location of said plurality of memory locations of said storage device.

26. The integrated circuit of claim 20, further comprising:

a parallel bus port, said storage device being accessible from said parallel bus port.

27. The integrated circuit of claim 20, further comprising:

a parallel bus port;

parallel bus interface circuitry coupled to said parallel bus port;

a memory; and an arbiter circuit coupled to said parallel bus interface circuitry and to said memory, said arbiter arbitrating access to said memory.

28. The integrated circuit of claim 27, further comprising:

a buffer manager circuit coupled to said first protocol packet framer/deframer circuit, said second protocol packet framer/deframer circuit and to said arbiter circuit, said buffer manager circuit comprising:

first and second receive pointer registers for pointing to a receive buffer in said memory; and first and second transmit pointer registers for pointing to a transmit buffer in said memory.

29. The integrated circuit of claim 27, further comprising:

means, coupled to said circuit switch multiplexer/demultiplexer, for managing buffering of substantially non-deframed isochronous network data in said memory.

30. A method, comprising:

framing network information, wherein network information frames include non-isochronous and isochronous slots;

deframing information of an isochronous slot of using a first protocol packet deframer circuit; and deframing information of another isochronous slot using a second protocol packet deframer circuit, said first and second protocol packet deframer circuits both being disposed on the same integrated circuit.

31. The integrated circuit of claim 30, wherein said first protocol packet framer/deframer circuit deframes ATM formatted slots, and wherein said second protocol packet framer/deframer circuit deframes HDLC formatted slots.

32. The method of claim 30 wherein each isochronous slot is formatted with at least one of a first protocol or a second protocol, the method further comprising the steps of:

separating the non-isochronous slots from the isochronous slots into a non-isochronous data stream and an isochronous data stream;

coupling the isochronous slots formatted with the first protocol to the first protocol packet deframer circuit; and coupling the isochronous slots formatted with the second protocol to the second protocol packet deframer circuit.

33. The method of claim 32 further comprising the step of:

demultiplexing the isochronous slots; and wherein the separating step includes the step of demultiplexing with a first demultiplexer each network information frame.

34. The method of claim 30 further comprising the steps of:

flaming information having a first protocol using a first protocol packet framer circuit;

framing information having a second protocol using a second protocol packet framer circuit;

combining the first protocol framed information and the second protocol framed information into isochronous slots; and combining isochronous slots with non-isochronous slots into a frame.

35. The method of claim 30, further comprising:

incrementing a counter of said integrated circuit so that a count value output from said counter corresponds with a slot number of the slot being received into said integrated circuit; and using said count value to address a slot mapping memory of said integrated circuit.

36. The method of claim 35, wherein said integrated circuit has a parallel bus port, said method further comprising:

programming said slot mapping memory of said integrated circuit via said parallel bus port.

37. The method of claim 35, further comprising:

storing information deframed by said first protocol packet deframer circuit in a first ring buffer; and storing information deframed by said second protocol packet deframer circuit in a second ring buffer.

38. An integrated circuit, comprising:

means for framing information, each information frame having isochronous and non-isochronous slots and each of said isochronous slots having information formatted by one of at least a first network protocol or a second network protocol;

means for receiving the framed information;

means for separating the isochronous slots and the non-isochronous slots;

a first means for combining information formatted by a first protocol into a first packet;

a second means for combining information formatted by a second protocol into a second packet; and means for coupling first protocol formatted information in an isochronous slot to the first means for combining and for coupling second protocol formatted information in another isochronous slot to the second means for combining.

39. The integrated circuit of claim 38 further comprising:

a first means for separating a packet of information formatted by a first protocol into first segments of information;

a second means for disassembling a packet of information formatted by a second protocol into second segments of information; and means for combining the first information segments and the second information segments into an isochronous data stream;

means for combining the isochronous data stream with a non-isochronous data stream.

40. The integrated circuit as in claim 39 wherein the means for combining includes the step of inserting the first segments and the second segments into isochronous slots of a frame and non-isochronous data stream segments into non-isochronous slots of the frame.

41. The integrated circuit of claim 38, wherein said first network protocol is an ATM protocol and wherein said second network protocol is an HDLC protocol.

42. The integrated circuit of claim 38, wherein said means for coupling comprises means for storing slot mapping information.

43. The integrated circuit of claim 38, further comprising:

means for managing a receive ring buffer;

a parallel bus port; and parallel bus interface circuitry coupled to said parallel bus port.

44. The integrated circuit of claim 38, further comprising:

a first packet framer circuit which frames information in accordance with a network protocol; and a second packet framer circuit which frames information in accordance with a network protocol, wherein said means for coupling comprises: a multiplexer having a first input lead, a second input lead, and an output lead, said first input lead being coupled to an output lead of said first packet framer circuit, said second input lead being coupled to an output lead of said second packet framer circuit, and an output lead being coupled to an output part of an isochronous network port of said integrated circuit; and a demultiplexer having an input lead, a first output lead, and a second output lead, said input lead being coupled to an input part of said isochronous network port, said first output lead being coupled to an input lead of said first packet deframer circuit, and said second output lead being coupled to an input lead of said second packet deframer circuit.

\* \* \* \* \*